United States Patent [19]

Kelly

[11] Patent Number: 5,014,168

[45] Date of Patent: May 7, 1991

[54] RADIO-LIGHT FIXTURE

[75] Inventor: Hugh P. Kelly, Winnetka, Ill.

[73] Assignee: Erie Glass Manufacturing Company, Park Ridge, Ill.

[21] Appl. No.: 549,769

[22] Filed: Jul. 9, 1990

[51] Int. Cl.$^5$ ............................................. H04M 1/22
[52] U.S. Cl. ........................................ 362/86; 362/253
[58] Field of Search .................. 362/23, 86, 253, 294, 362/249

[56] References Cited

U.S. PATENT DOCUMENTS

| | | | |
|---|---|---|---|
| 2,050,044 | 8/1936 | D'Onofrio | 362/86 X |
| 2,070,088 | 2/1937 | Montaruli | 362/86 |
| 4,322,780 | 3/1982 | Murakami et al. | 362/86 X |
| 4,949,077 | 8/1990 | Mbuthia | 362/253 X |

Primary Examiner—Stephen F. Husar
Assistant Examiner—Peggy A. Neils
Attorney, Agent, or Firm—Lee, Mann, Smith, McWilliams & Sweeney

[57] ABSTRACT

A fixture mountable upon a wall or other surface including a case, at least one socket connected to said case, each said socket being adapted to receive and illuminate a light bulb, a radio disposed substantially within said case, said radio being mounted upon the interior of said case in close proximity to said light bulb to prevent the accumulation of moisture upon said radio.

1 Claim, 1 Drawing Sheet

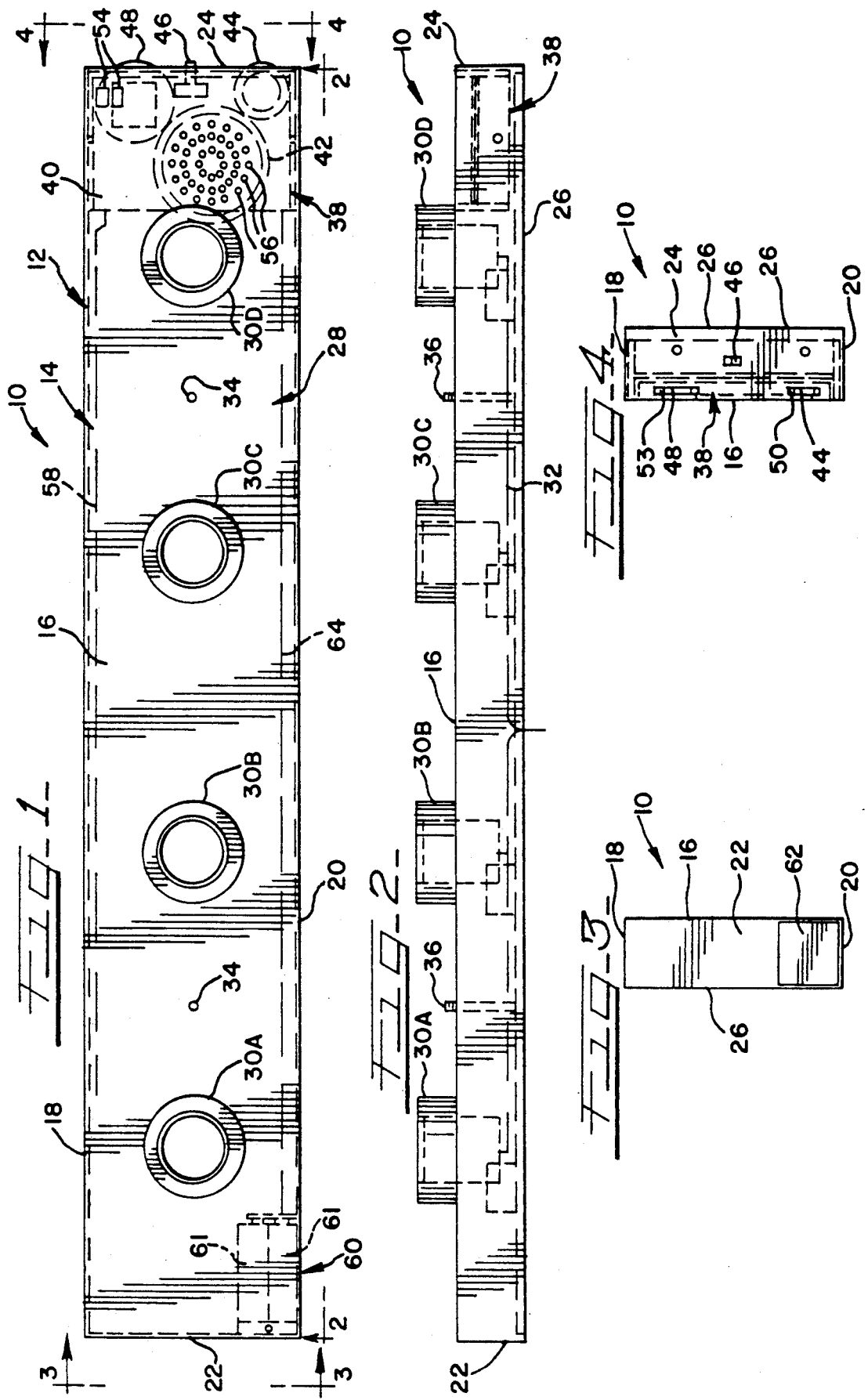

RADIO-LIGHT FIXTURE

BACKGROUND OF THE INVENTION

The present invention relates to light fixtures and in particular to light fixtures for use in a room having a shower or bathtub. Stand-alone sinks are provided in many bathrooms and locker rooms. These stand-alone sinks do not include a countertop surface upon which articles such as a radio may be safely placed. When it is desired to listen to a radio in a bathroom having a stand-alone sink, the lack of countertop space may necessitate that the radio be precariously positioned on the edge of the sink where the radio may be easily be knocked to the floor or into the sink which may be full of water, thereby causing damage to the radio and creating potential injury to the user. The radio may also fall from the sink into a bathtub of water causing damage to the radio and potential injury to the user. It has therefore been found desireable to utilize a radio which is capable of being mounted in an unobtrusive location where the radio is not susceptible to being knocked to the floor or into a potentially dangerous pool of water.

Radios utilized in a bathroom or similar room which contains a bathtub and/or shower have suffered deleterious effects due to the steam and humidity generated by the shower or bathtub. It has therefore been found desireable to locate the radio and its components in a location adjacent to a heat generating source such as a light bulb which helps to prevent the accumulation of moisture upon the radio and its components.

SUMMARY OF THE INVENTION

The present invention provides a fixture which is mountable upon a wall or other surface which includes a case and at least one socket connected to said case with each socket being adapted to receive and illuminate a light bulb. A radio is disposed substantially within the case thereby being safely secured in a position where the radio is not susceptible to damage and does not pose a hazard to the user. The radio includes a speaker and other components which are mounted to the interior of the case adjacent a heat generating source such as the light bulb to prevent the accumulation of moisture upon the radio and its component parts.

DESCRIPTION OF THE DRAWINGS

FIG. 1 is a front elevational view of the radio-light fixture.

FIG. 2 is a bottom view taken along lines 2—2 of FIG. 1.

FIG. 3 is a side elevational view taken along lines 3—3 of FIG. 1.

FIG. 4 is a side elevational view taken along lines 4—4 of FIG. 1.

DESCRIPTION OF THE PREFERRED EMBODIMENT

The radio-light fixture 10 includes a case 12 which comprises a cover 14 having a face plate 16, a top wall 18, a bottom wall 20, a left side wall 22, and a right side wall 24 each of which extend at a right angle from the face plate 16. A rear panel 26 is removably attached to the cover 14 so as to create a chamber 28 within the case 12.

Sockets 30A-D are attached to and extend through the face plate 16 of the cover 14. Each socket 30A-D is adapted to retain and illuminate a standard light bulb (not shown). Each socket 30A-D is connected by a wire 32 to an electrical source. The face plate 16 and the rear panel 26 each include a pair of apertures 34. A fastener 36 extends through each aperture 34 to facilitate the removable mounting of the fixture 10 to a wall or other surface.

A radio 38 is located within the chamber 28 adjacent the right side wall 24 and the socket 30D. The radio 38 includes a circuit board 40 which is connected to a speaker 42. The radio 38 also includes an on-off dial 44 for turning the radio 38 on and off and for controlling the volume of the radio 38. An AM-FM switch 46 is provided to switch the radio 38 between AM and FM stations and a tuning dial 48 is provided for tuning the radio 38 to the desired radio station. The on-off dial 44, the AM-FM switch 46 and the tuning dial 48 are all connected to the circuit board 40.

The on-off dial 44 is located at the lower end of the right side wall 24 and extends partially through a slot 50 in the right side wall 24 to facilitate rotation of the dial 44 from outside the case 12. The AM-FM switch 46 is located near the center of the right side wall 24 and extends through slot 52 in the right side wall 24 so that the switch 46 may be operated from the exterior of the case 12. The tuning dial 48 is located near the top of the right side wall 24 and extends partially through a slot 53 in the right side wall 24 so as to provide rotational control of the dial 48 from the exterior of the case 12. Square apertures 54 are provided in the face plate 6 adjacent the tuning dial 48. The apertures 54 provide visual access to the dial 48. The AM or FM station to which the radio 38 is tuned appears through the apertures 54.

The face plate 16 also includes a plurality of apertures 56 which are located adjacent the socket 30D. The speaker 42 is located within the chamber 28 adjacent the apertures 54. An antenna 58 extends from the circuit board 40 and along the top wall 18 of the cover 14. A battery pack 60 comprising four AA batteries 61 is provided at the left side wall 22 near the bottom wall 20. Access to the battery pack 60 is provided through a door 62 which is located in the lower end of the left side wall 22. A wire 64 is connected between the battery pack 60 and the circuit board 40 to provide power for the operation of the radio 38. While in the present embodiment the radio 38 is powered by the battery pack 60, the radio 38 may also be connected to the electrical source for the sockets 30A-D.

In operation the fixture 10 is mounted to a wall or other surface with the fasteners 36. The wire 32 is connected to an electrical source which is controlled by a standard wall switch (not shown). Operation of the wall switch will selectively supply electrical power to the sockets 30A-D which in turn will illuminate the light bulbs contained in the sockets 30A-D. As the radio 38 is powered by the battery pack 60, the radio 38 may be operated independently of the electric current provided through the wires 32. The radio 38 is operated in a standard manner. The AM-FM switch 46 is positioned to either the AM or the FM position as desired. The on-off dial 44 is turned to the on position and is adjusted to provide the desired volume. The tuning dial 48 is rotated to tune the radio 38 to the desired radio station. The speaker 42 provides the audio output from the radio 38 through the apertures 56 in the face plate 16.

As can be seen the fixture 10 provides a radio 38 which may be safely mounted to a wall or other surface when no suitable location is available upon which to set a standard radio. The light bulb (not shown) in the sockets 30A-D will generate heat when they are illuminated. The speaker 42 and the apertures 56 are located adjacent to the socket 30D so that the heat generated by the light bulb will prevent the accumulation of moisture on the speaker 42 and the other radio components.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A combination light fixture and radio adapted for use in areas of high humidity, steam and the like and adapted for substantially permanent safety mounting upon a wall surface, said fixture comprising a case made of a metal material and having a front wall and a back wall, a plurality of apertures located in said front wall, substantially permanent mounting means on said back wall, at least one socket attached to and extending through an exterior surface of said front wall and located adjacent said apertures, said socket being adapted to receive and activate an electrical heat and light generating source, an electrically operated radio disposed substantially within said case adjacent said apertures and in close and operable proximity to said source, said radio including an on-off dial, a tuning dial and an on-off switch, said on-off dial, tuning dial and on-off switch extending partially through a sidewall of said case to facilitate operation thereof from the exterior of said case and an antenna operably connected to said radio and extending within said case, whereby said source is operably effective to heat said case, said radio and said antenna and to maintain said radio and antenna in a heated and dry state to thereby provide operable conditions for said radio and antenna so that the mounting and use of said fixture in an area of substantial wetness will not adversely effect the operation of said radio.

* * * * *